(12) United States Patent
Yamamoto

(10) Patent No.: US 9,386,122 B2
(45) Date of Patent: Jul. 5, 2016

(54) SERVER SELECTING APPARATUS, INFORMATION PROCESSING APPARATUS, AND NON-TRANSITORY COMPUTER-READABLE MEDIUM STORING COMPUTER-EXECUTABLE PROGRAM FOR SERVER SELECTING APPARATUS

(71) Applicant: Hiroyuki Yamamoto, Kasugai (JP)

(72) Inventor: Hiroyuki Yamamoto, Kasugai (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 486 days.

(21) Appl. No.: 13/685,158

(22) Filed: Nov. 26, 2012

(65) Prior Publication Data
US 2013/0138729 A1    May 30, 2013

(30) Foreign Application Priority Data
Nov. 25, 2011    (JP) .................. 2011-258162

(51) Int. Cl.
*G06F 15/16* (2006.01)
*H04L 29/06* (2006.01)
(Continued)

(52) U.S. Cl.
CPC .............. *H04L 67/42* (2013.01); *G06F 3/1204* (2013.01); *G06F 3/126* (2013.01); *G06F 3/1285* (2013.01);
(Continued)

(58) Field of Classification Search
CPC ... H04L 67/42; H04L 67/1008; G06F 3/1204; G06F 3/126; G06F 3/1291; H04N 1/00204; H04N 1/00832; H04N 1/00925; H04N 1/32106; H04N 1/32502; H04N 2201/3205; H04N 201/3276; H04N 2201/3204; H04N 2201/001; H04N 2201/009
See application file for complete search history.

(56) References Cited

U.S. PATENT DOCUMENTS 7,027,169 B1 *   4/2006   Morikawa et al. ............ 358/1.14
7,587,476 B2 *   9/2009   Sato ............................. 709/223
(Continued)

FOREIGN PATENT DOCUMENTS

| JP | 2000-293337 A | 10/2000 |
| JP | 2001-236294 A | 8/2001 |
| JP | 2006-163795 A | 6/2006 |

OTHER PUBLICATIONS

Japanese Office Action dated Feb. 24, 2015 from Japanese Application No. 2011-258162, together with an English language translation.

*Primary Examiner* — Cheikh Ndiaye
(74) *Attorney, Agent, or Firm* — Scully, Scott, Murphy & Presser, P.C.

(57) ABSTRACT

A server selecting apparatus which is configured to communicate with at least one image processing apparatus includes: a communication unit configured to communicate with the at least one image processing apparatus; and a control device. The control device is configured to: acquire, via the communication unit, specific function information as to whether the at least one image processing apparatus is capable of executing the processing of a specific function which is a specific image processing function; identify at least one specific-function executable apparatus which is capable of executing the processing of the specific function from among the at least one image processing apparatus, based on the specific function information; and select one image processing apparatus as a specific server, which manages execution information of the specific function with respect to all of the at least one specific-function executable apparatus, from among the at least one specific-function executable apparatus.

10 Claims, 9 Drawing Sheets

(51) Int. Cl.
  *H04L 29/08*  (2006.01)
  *G06F 3/12*  (2006.01)
  *H04N 1/00*  (2006.01)
  *H04N 1/32*  (2006.01)
(52) U.S. Cl.
  CPC ........ *H04L 67/1008* (2013.01); *H04L 67/1012* (2013.01); *H04N 1/00204* (2013.01); *H04N 1/00832* (2013.01); *H04N 1/00925* (2013.01); *H04N 1/32106* (2013.01); *H04N 1/32502* (2013.01); *G06F 3/1291* (2013.01); *H04N 2201/001* (2013.01); *H04N 2201/0094* (2013.01); *H04N 2201/3204* (2013.01); *H04N 2201/3205* (2013.01); *H04N 2201/3276* (2013.01)

(56) References Cited

U.S. PATENT DOCUMENTS

| | | | |
|---|---|---|---|
| 2007/0019229 A1* | 1/2007 | Matsuhara | 358/1.15 |
| 2011/0026060 A1* | 2/2011 | Kang et al. | 358/1.13 |
| 2011/0069341 A1* | 3/2011 | Kim et al. | 358/1.15 |
| 2012/0113465 A1* | 5/2012 | Matsuyama et al. | 358/1.15 |

* cited by examiner

| APPARATUS NAME | FUNCTION |
|---|---|
| MFP100 | FAX, PC-PRINT |
| MFP101 | FAX, PC-PRINT, PC-SCAN, COPY |
| MFP102 | PC-PRINT, PC-SCAN, COPY |
| MFP103 | PC-PRINT, PC-SCAN, COPY |
| MFP104 | PC-PRINT |

Fig. 4

| FUNCTION | FAX, PC-PRINT |
|---|---|
| CPU SPEED | 400MHz |
| START-UP TIME | 08:30:00 ON 30/11/2011 |
| TOTAL NUMBER OF PAGES | FAX = 200 PAGES, PC-PRINT = 400 PAGES |
| SERVER NAME | FAX=MFP100、 PC-PRINT=MFP104 |
| UPDATE INTERVAL | 24 HOURS |

| USER NAME | NUMBER OF PAGES THAT CAN BE TRANSMITTED | NUMBER OF PAGES THAT CAN BE RECEIVED |
|---|---|---|
| USER A | 100 | 1000 |
| USER B | 10 | 250 |
| USER C | 500 | NIL |

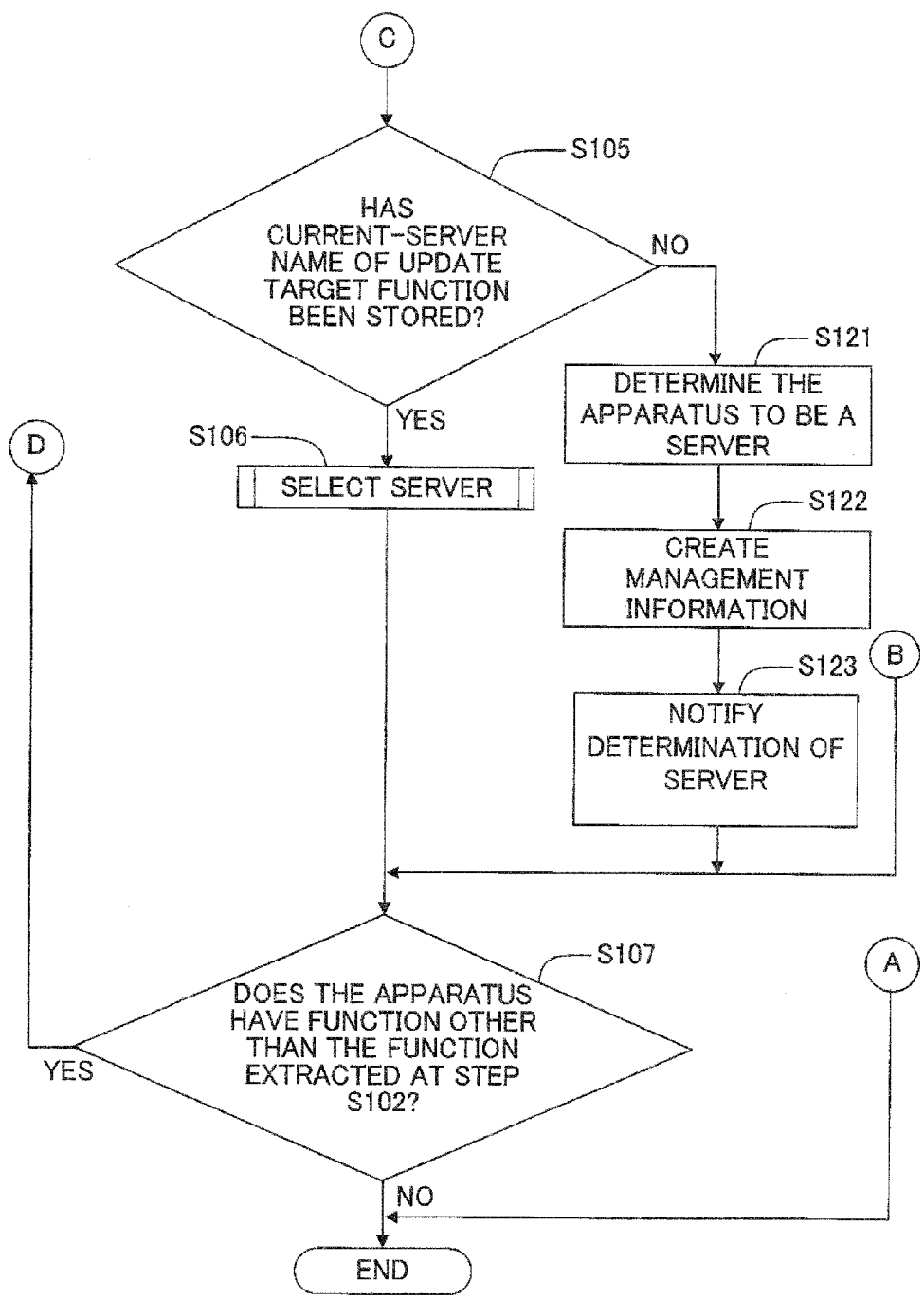

SERVER SELECTING APPARATUS, INFORMATION PROCESSING APPARATUS, AND NON-TRANSITORY COMPUTER-READABLE MEDIUM STORING COMPUTER-EXECUTABLE PROGRAM FOR SERVER SELECTING APPARATUS

CROSS REFERENCE TO RELATED APPLICATION

The present application claims priority from Japanese Patent Application No. 2011-258162 filed on Nov. 25, 2011, the disclosure of which is incorporated herein by reference in its entirety.

BACKGROUND OF THE INVENTION

1. Field of the Invention

The present invention relates to a technology which selects an image processing apparatus which is made to function as a server, from a plurality of image processing apparatuses.

2. Description of the Related Art

A technology of disposing a server in the network for managing execution information related to a certain function in a network system connected to a plurality of image processing apparatus has hitherto been known. Moreover, as a technology of disposing a server in the network, a technology of imparting a function as a server to a certain image processing apparatus, without providing a dedicated server which controls each image processing apparatus, and controlling other image processing apparatus, has hitherto been known.

As a technical document of imparting a function as a server to an image processing apparatus, Japanese Patent Application Laid-open No. 2006-163795 is available. In Japanese Patent Application Laid-open No. 2006-163795, a technology, in which there is a network N to which a plurality of printers P1, P2, and P3 and a client C1 are connected, and when the client C1 seeks a function from the printer P1, the printer P1 gathers function information from the other printers P2 and P3, and the function information gathered is provided to the client C1 together with the function information of the printer P1, has been disclosed.

SUMMARY OF THE INVENTION

However, the following problem was there in the conventional technology. That is, when a user is made to select an image processing apparatus which is to be made to function as a server, according to a function and performance of the image processing apparatus, sometimes an inappropriate image processing apparatus may be selected.

The present invention is made to solve the issues in the conventional technology. In other words, an object of the present invention is to provide a technology which enables to select an appropriate image processing apparatus at the time of selecting an image processing apparatus which is to be made to function as a server, from the plurality of image processing apparatuses.

According to an aspect of the present invention, there is provided a server selecting apparatus which is configured to communicate with at least one image processing apparatus, the server selecting apparatus including: a communication unit configured to communicate with the at least one image processing apparatus; and a control device configured to: acquire, via the communication unit, specific function information as to whether the at least one image processing apparatus is capable of executing the processing of a specific function which is a specific image processing function; identify at least one specific-function executable apparatus which is capable of executing the processing of the specific function from among the at least one image processing apparatus, based on the specific function information; and select one image processing apparatus as a specific server, which manages execution information of the specific function with respect to all of the at least one specific-function executable apparatus, from among the at least one specific-function executable apparatus.

The control device of the server selecting apparatus according to the present invention acquires the specific function information as to whether the at least one image processing apparatus is capable of executing processing of a specific function. Printing, scanning, facsimile transmission, and copy are examples of the image processing function. Moreover, the server selecting apparatus selects one image processing apparatus from among the at least one specific-function executable apparatus which is capable of executing processing of the specific function, as the specific server for the specific function. The server selecting apparatus may be an image processing apparatus similar to the at least one image processing apparatus or may be a dedicated apparatus for selecting a server.

In other words, the server selecting apparatus according to the present invention, at the time of selecting the specific server which manages the execution information related to the specific function, makes the image processing apparatus which is capable of executing the processing of the specific function a selection target of the specific server. In such manner, by selecting the image forming apparatus capable of executing the processing of the specific function as the specific server, there is no load of communication when the specific function is executed by the specific server. Consequently, the image processing apparatus which has been selected is preferable as the specific server.

According to the present invention, it is possible to realize a technology which enables to select an appropriate image processing apparatus at the time of selecting an image processing apparatus which is to be made to function as a server, from among a plurality of image processing apparatuses.

BRIEF DESCRIPTION OF THE DRAWINGS

FIG. 4 is a diagram showing a format of an apparatus information DB held by the MFP.

FIG. 5 is a diagram showing a format of management information held by MFP which functions as a FAX server.

FIGS. 6A and 6B show a flowchart showing a server auto-determination processing in a first example of the present invention.

DETAILED DESCRIPTION OF THE PREFERRED EMBODIMENTS

An exemplary embodiment in which a server selecting apparatus according to the present invention is substantiated will be described below in detail while referring to the accompanying diagrams. The embodiment is an embodiment in which, the present invention is applied to an image processing system which includes a plurality of MFPs (Multi-Function Peripherals) and a personal computer (PC) which inputs a job to the MFP.

<Overall Configuration of Image Processing System>

Figures 1, 2:
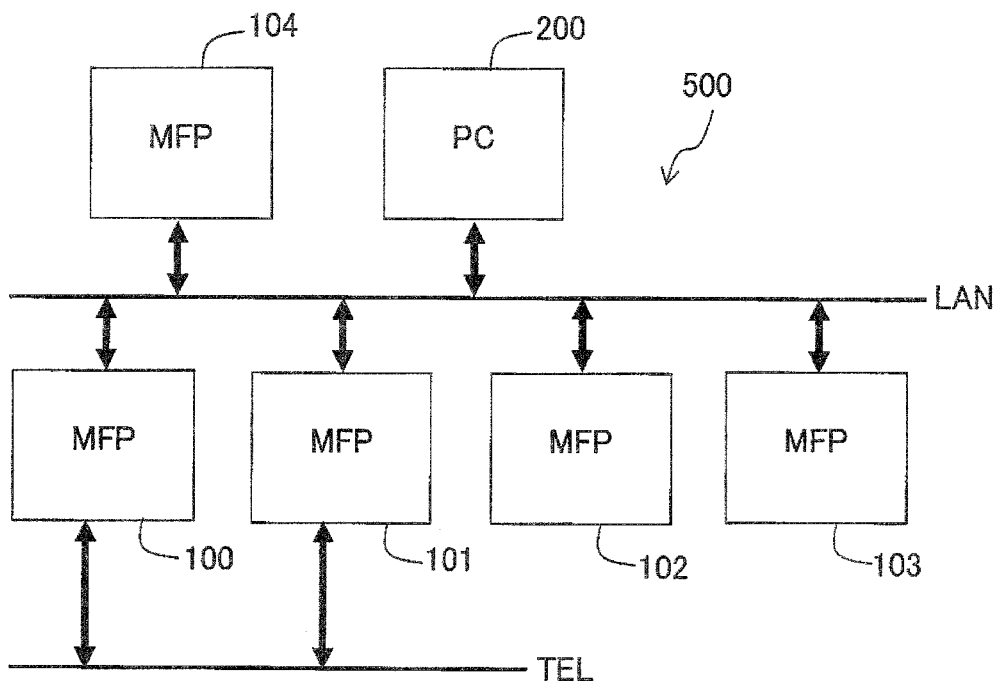
FIG. 1 is a block diagram showing a configuration of an image processing system according to an embodiment of the present invention.
FIG. 2 is a diagram showing a list of functions of each MFP which forms the image processing system.

An image processing system 500 according to the embodiment, as shown in FIG. 1, includes MFPs 100, 101, 102, 103, and 104, each having at least one image processing function, and a PC 200 which inputs a job to each of the MFPs 100, 101, 102, 103, and 104. In the image processing system 500, the PC 200 and the MFPs 100, 101, 102, 103, and 104 are connected via a LAN (local area network). Moreover, the MFPs 100 and 101 have a FAX (facsimile) function, and are connected to a telephone line.

All the MFPs 100, 101, 102, 103, and 104 are not required to have the same model, and may differ mutually. In the embodiment, each of the MFPs 100, 101, 102, 103, and 104 is let to have the following image processing functions as shown in FIG. 2. From among the image processing functions, a function of printing according to a print instruction output from the PC 200 is called as a 'PC-PRINT function', and a function of scanning a document according to a scan instruction output from the PC 200 is called as a 'PC-SCAN function'. The MFP 100 has the 'FAX function' and the 'PC-PRINT function'. The MFP 101 has the 'FAX function', the 'PC-PRINT function', the 'PC-SCAN function', and a 'COPY function'. The MFP 102 has the 'PC-PRINT function', the 'PC-SCAN function', and the 'COPY function'. The MFP 103 has the 'PC-PRINT function', the 'PC-SCAN function', and the 'COPY function'. The MFP 104 has the 'PC-PRINT function'.

Any number of MFPs and PCs forming the image processing system 500 may be connected. Moreover, other image processing apparatuses or information processing apparatuses may also be connected to the image processing system 500.

<Configuration of MFP>

Figure 3:
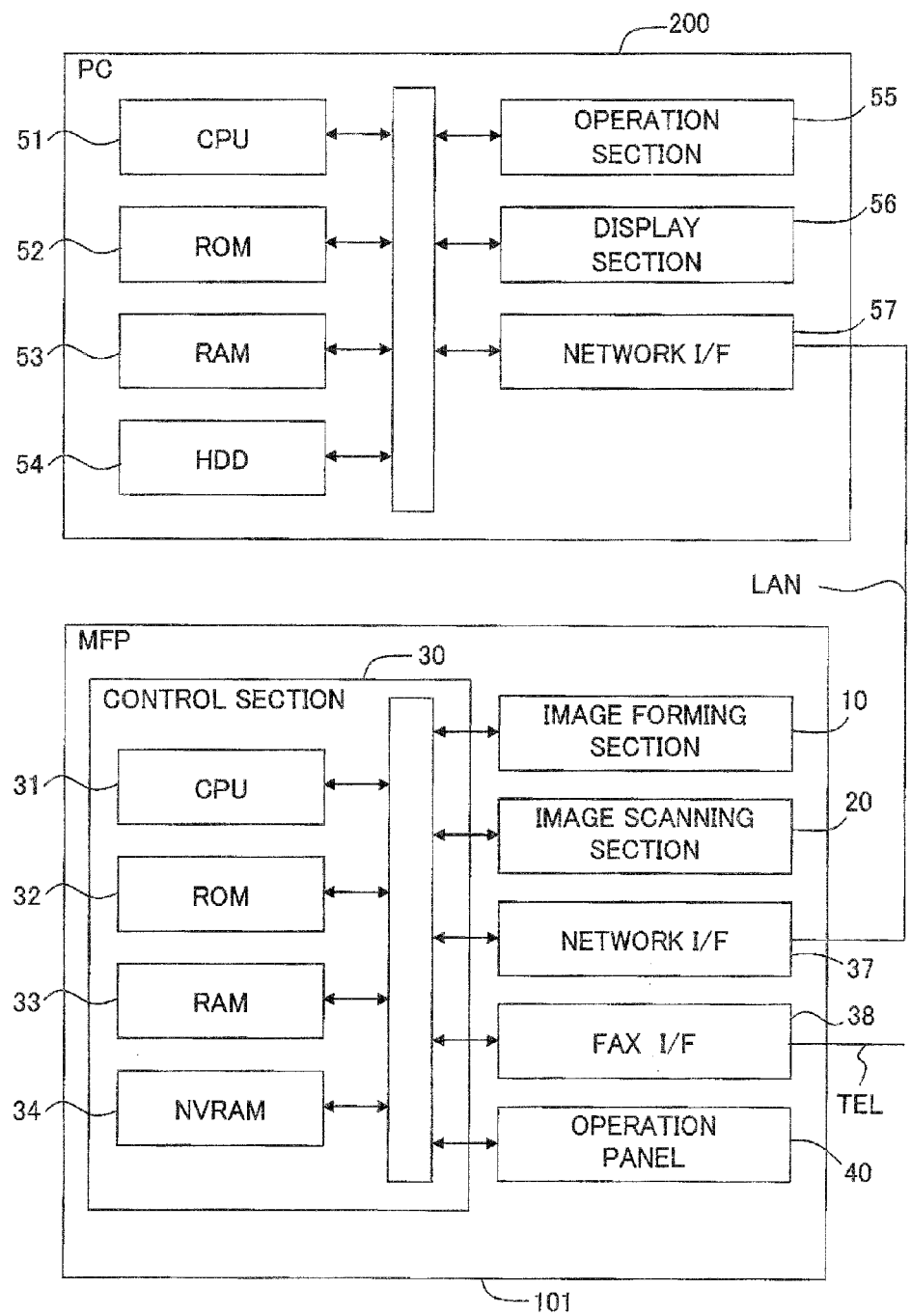
FIG. 3 is a block diagram showing an electrical configuration of a PC and the MFP in the image processing system.

Next, a schematic configuration of the MFP 101 as an example of the MFPs 100, 101, 102, 103, and 104, will be described below. The MFP 101, as shown in FIG. 3, includes a control section 30 which includes a CPU (central processing unit) 31, a ROM (read only memory) 32, and a RAM (random access memory) 33, and an NVRAM (non-volatile RAM) 34. Moreover, the control section 30 is electrically connected to an image forming section 10 which forms an image on a paper, an image scanning section 20 which scans an image on a document, a network interface 37, a FAX interface 38, and an operation panel 40 on which, a display of an operation status and an input operation by a user are carried out. The image forming section 10 and the image scanning section 20 are examples of the image processing unit.

Control programs for controlling the MFP 101, various settings, and initial values are stored in the ROM 32. The RAM 33 is to be used as a work area in which various control programs are read out, or, a storage area in which, image data is to be stored temporarily.

The CPU 31 controls various components of the MFP 101 while storing a processing result in the RAM 33 or the NVRAM 34 according to signals which are sent from sensors, or the control program which is read out from the ROM 32.

The network interface 37 is an interface which enables communication with an external equipment via LAN. The FAX interface 38 is an interface which enables communication with an external equipment via a telephone line. In the embodiment, transceiving of data to and from the PC 200 or the other MFPs 100, 102, 103, and 104 is carried out via the network interface 37 and the FAX interface 38. The network interface 37 is an example of a communication unit.

The other MFPs 100, 102, 103, and 104 have, by and large, the same arrangement as for the MFPs 101, except for components to be connected to the control section 30, which differ according to a function which each MFP is capable of executing. For instance, the MFP 100 has the image forming section 10 and the FAX interface 38, but does not have the image scanning section 20. Therefore, the MFP 100 is capable of executing the PC-SCAN function and the PC-PRINT function, but is not capable of executing the COPY function. Moreover, the MFP 104 has the image forming section 10 but does not have the image scanning section 20 and the FAX interface 38. Therefore, the MFP 104 is capable of executing the PC-PRINT function, but is not capable of executing the FAX function, the PC-SCAN function, and the COPY function.

<Configuration of PC>

Next, a schematic configuration of the PC 200 will be described below. The PC 200, as shown in FIG. 3, includes a CPU 51, a ROM 52, a RAM 53, an HDD 54, an operating section 55 which includes keys and mouse, a display section 56 which includes a liquid crystal display, and a network interface 57.

The HDD 54 of the PC 200 has an operating system (OS), a device driver which controls various devices, and an application program which has a print-instruction function for a word processor and a spreadsheet software incorporated therein. A printer driver, a scanner driver, and a FAX driver for each of the MFPs 100, 101, 102, 103, and 104 are also incorporated in the HDD 54.

The CPU 51 carries out various processing while storing a calculation result in the RAM 53 or the HDD 54, according to the application program which has been read out from the HDD 54 or the control program read out from the ROM 52. Operation of the printer driver is also processed by the CPU 51. A unit including the CPU 51, the ROM 52, the RAM 53, and the HDD 54 is an example of the control device.

The network interface 57 is an interface which enables communication with external equipment via LAN. In the embodiment, transceiving to and from each of the MFPs 100, 101, 102, 103, and 104 is carried out via the network interface 57. The network interface 57 is an example of a communication unit.

<Outline of Operation of Image Processing System>

Next, an operation of the image processing system 500 will be described below. In the image processing system 500 according to the embodiment, execution information is managed for each image processing function (in the embodiment for each of the FAX function, the PC-PRINT function, the PC-SCAN function, and the COPY function). The management of the execution information is carried out by any one of the MFPs, 100, 101, 102, 103, and 104 in the image processing system 500 functioning as a server.

Each of the MFPs 100, 101, 102, 103, and 104 stores in the NVRAM 34 a database (hereinafter, called as 'apparatus (MFP) information DB 341') in which information of that apparatus (MFP) is stored. Concretely, the apparatus information DB 341, as shown in FIG. 4, has a correspondence function which that apparatus (MFP) is capable of executing, a CPU speed which is a processing speed of the CPU 31 of that apparatus, a start-up time which is a time at which that apparatus has started, the number of papers accumulated which have been processed by that apparatus for each function, a server name which is a name of a current server which manages execution information of the corresponding function of that apparatus, and an updating interval which is an interval at which the server is updated periodically, stored therein. FIG. 4 shows contents stored in the apparatus information DB 341 of the MFP 100 as an example.

Moreover, an MFP which functions as a server for a certain function, from among the MFPs 100, 101, 102, 103, and 104, stores execution information related to that function in the NVRAM 34. For instance, when the MFP 100 is a server of the FAX function, as shown in FIG. 5, for each user, a user name, the number of pages that can be transmitted, and the number of pages that can be received are stored as one record in the management information database (hereinafter, 'management information DB 342') of the NVRAM 34 of the MFP 100.

For instance, in the image processing system 500, any user who has been registered in the management information DB 342, at the time of transmitting (or receiving) FAX data by using the MFP 100 or the MFP 101 from among the MFPs 100, 101, 102, 103, and 104 in the image processing system 500, the MFP 100 or the MFP 101 which handles the FAX data, upon referring to the apparatus information DB 341 of that MFP, makes an access to the MFP which has been registered as a server for the FAX function, and acquires information which has been stored in the management information DB 342. In a case in which, the number of pages which can be transmitted (or the number of pages which can be received) which have been stored in the management information DB 342 for the user using the FAX function is smaller than the number of pages of the FAX data, that transmission (or reception) is restricted. Whereas, in a case in which, the number of pages which can be transmitted (or the number of pages which can be received) which have been stored in the management information DB 342 for the user using the FAX function is more than the number of pages of the FAX data, that transmission (or reception) is executed. When the transmission (or reception) of the FAX data is completed, the number of pages which can be transmitted (or the number of pages which can be received) of the management information DB 342 equivalent to the number of pages transmitted (or equivalent to the number of pages received) is deducted. Even for the other functions, the number of pages which can be used is controlled by the other MFP.

<Procedure for Determining Server>

Next, a procedure for determining a server for each function will be described below. A server may be determined individually by the respective MFPs 100, 101, 102, 103, and 104, or may be determined by an apparatus other than the MFPs 100, 101, 102, 103, and 104 in the image processing system 500. As a first example, a procedure for determining a server by the MFP (such as the MFP 100), and as a second example, a procedure for determining a server by an apparatus other than the MFP (such as the PC 200) will be described below.

[First Example]

A server auto-determination processing which is executed by the MFP 100 (an example of the server selecting apparatus and the information processing apparatus) will be described below while referring to a flowchart in FIG. 6. The server auto-determination processing is executed repeatedly by the CPU 31 of the MFP 100 at a predetermined interval (for example, 10 minutes). The server auto-determination processing is executed not only by the MFP 100 but also by the other MFPs 101, 102, 103, and 104.

In the server auto-determination processing, firstly, a judgment of whether or not update conditions for updating a server have been satisfied is made (step S100). In the first example, satisfying the update conditions corresponds to a fact that a time elapsed after the previous update condition has been satisfied is longer than an update interval which has been stored in the apparatus information DB 341 of that MFP. Moreover, a start-up of the MFP 100 is also included in the update conditions. In a case in which, the update conditions are not satisfied (NO at step S100), the server auto-determination process is terminated.

When the update conditions are satisfied (YES at step S100), by referring to the apparatus information DB 341 of the MFP 100, a function held by the MFP 100 and the server of which is the MFP 100 is excluded from the target of the server auto-determination processing (step S101). In a case that all the functions of the MFP 100 are excluded from the target of the server auto-determination processing as a result of step S101, the server auto-determination processing is terminated.

Next, a function, which is held by the MFP 100 and the server of which is not the MFP 100, is extracted as a to-be-updated function (an example of the specific function) (step S102). Then, with respect to the to-be-updated function extracted at step S102, a server-name acquisition processing is executed (step S103). In the server-name acquisition processing, an apparatus name of an MFP which is designated as a server of the to-be-updated function at the current point of time (hereinafter called as a 'current server') is acquired. Namely, current-server name of the to-be-updated function (an example of the specific function information) is acquired at step S103.

Figure 7:
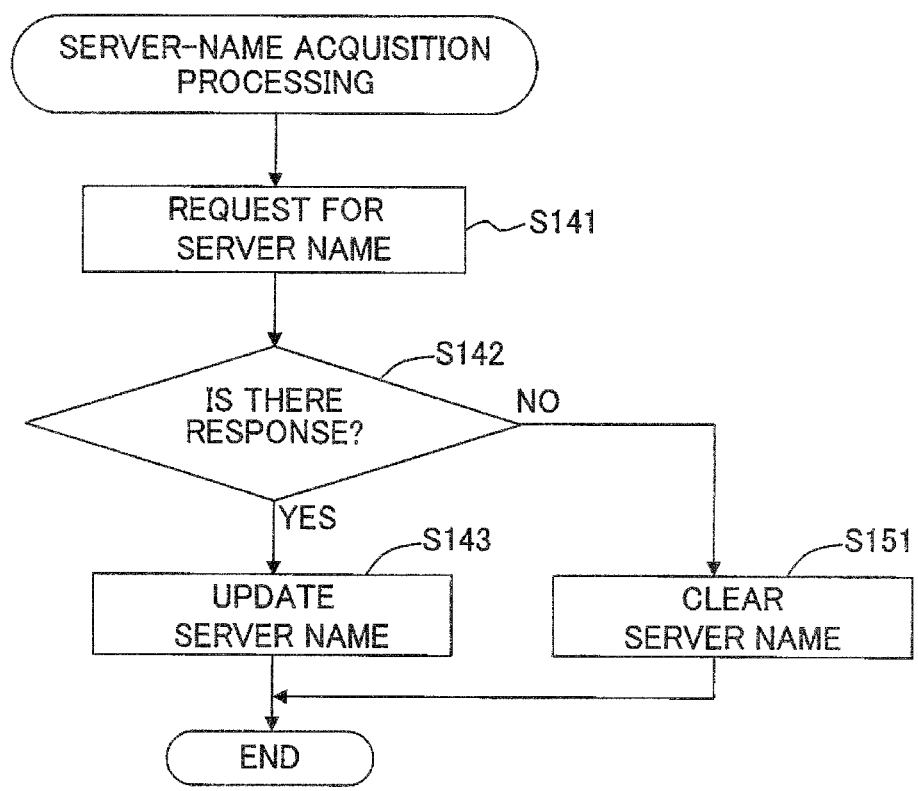
FIG. 7 is a flowchart showing a server-name acquisition processing in the first example.

FIG. 7 shows the server-name acquisition processing at step S103. Concretely, in the server-name acquisition processing, firstly, a request for a server name for the function which has been extracted at step S102 is transmitted by the MFP 100 to each of the MFPs 101, 102, 103, and 104 in the image processing system 500 (step S141). For instance, in a case in which, the 'PC-PRINT' function is extracted (as the specific function) at step S102, a request for a server name for the 'PC-PRINT' function is transmitted.

From among the apparatuses other than the MFP 100 (other MFP) which has received the request for server name, an apparatus which is a server for the 'PC-PRINT' function (an example of the specific-function executable apparatus) responds it's apparatus-name. In other words, the MFP 100 identifies the apparatus which is capable of executing the processing of the 'PC-PRINT' function. An apparatus which is not a server for the 'PC-PRINT' function, does not respond.

After step S141, the MFP 100 makes a judgment of whether or not there was a response from the current server (step S142). In a case that there was a response (YES at step S142), a server name which has been stored as a server for the 'PC-PRINT' function in the apparatus information DB 341 of the MFP 100 is updated to a name of the apparatus which has responded (current server) (step S143). In a case that there was no response till elapsing of a predetermined time (NO at step S142), since it means that a server for the 'PC-PRINT' function does not exist at the current time, a server name which has been stored for the 'PC-PRINT' function is cleared from the apparatus information DB 341 of the MFP 100 (step S151). After step S143 or step S151, the server-name acquisition processing is terminated.

Figure 6A:
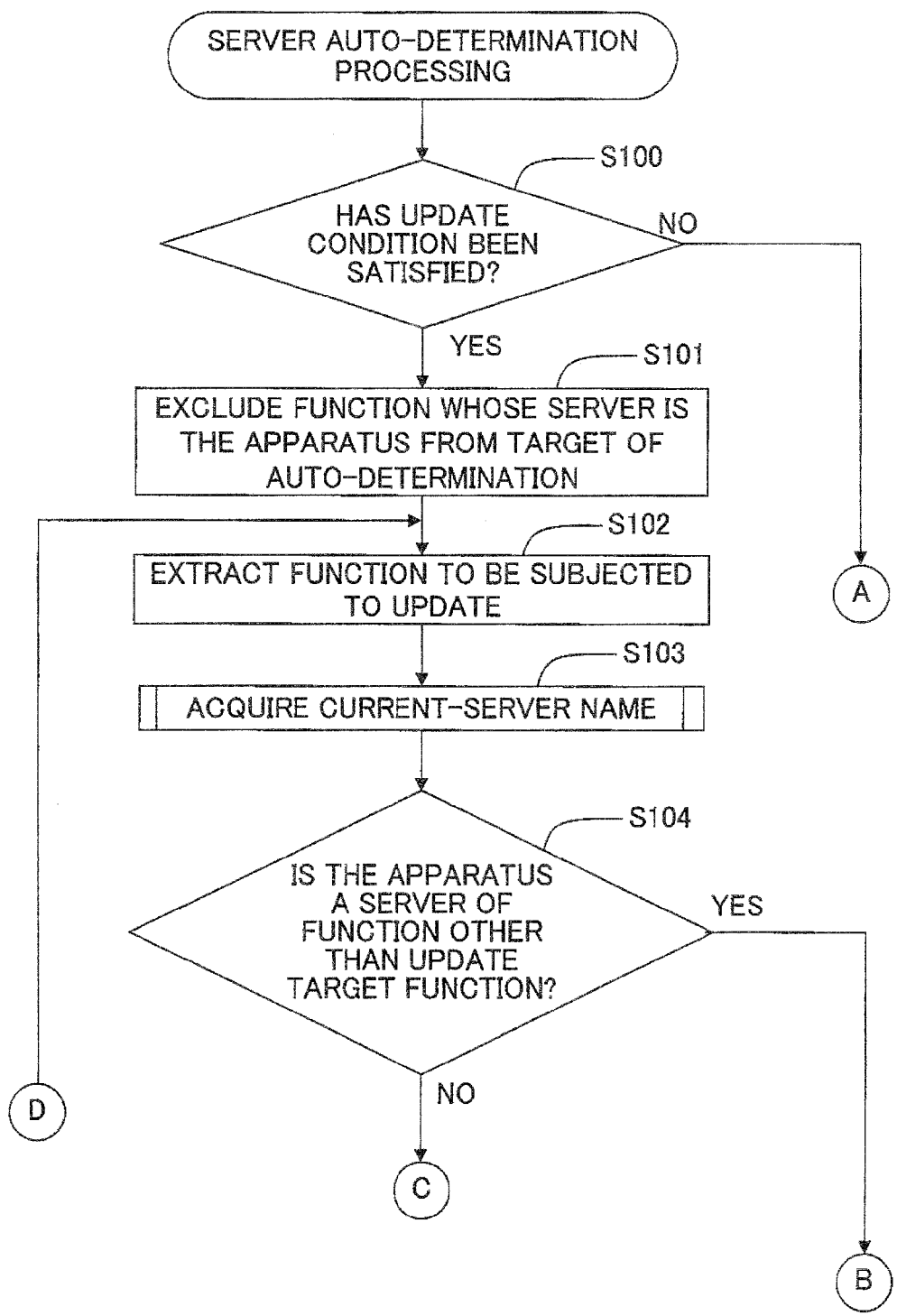

Returning to the description of FIG. 6, after the server name of the current server has been acquired at step S103, the MFP 100 makes a judgment of whether or not it is a server corresponding to the function other than the function that has been extracted at step S102 (step S104). When one apparatus is a server for a plurality of functions, processing load of that apparatus is high. Therefore, in a case in which, the MFP 100 is already a server corresponding to the function other than the function that has been extracted at step S102 (YES at step S104), determination of server to be carried out from step S104 is avoided, and the process shifts to step S107.

In a case in which, the MFP 100 is not a server corresponding to the function other than the function that has been extracted at step S102 (NO at step S104), the MFP 100 refers to the information DB 341, and makes a judgment of whether or not a current server name for the function which has been extracted at step S102 has been stored (step S105). In a case in which, the current server name for the function extracted at step S102 has not been stored (NO at step S105), the MFP 100 determines the MFP 100 to be a server corresponding to that function (S121). In other words, the name of the MFP 100 is stored in the apparatus information DB 341 of the MFP 100 as a server name corresponding to that function. Moreover, management information DB 342 for managing execution information for that function is created (step S122). A record of the management information DB 342 may be input by the user at the time of creating the management information DB 342 or may be added later. Moreover, a fact that the MFP 100 has determined the MFP 100 to be a server of that function is notified to other apparatuses (step S123). As the other apparatuses receive the notification at step S123, other apparatuses update the server name corresponding to that function which has been stored in the apparatus information DB 341 of the respective apparatus to the MFP 100.

Whereas, in a case in which, for the function extracted at step S102, a current server (YES at step S105) has been stored, the server selection processing of selecting which one of the current server and the MFP 100 is suitable as a server for that function is executed (step S106).

Figure 8:
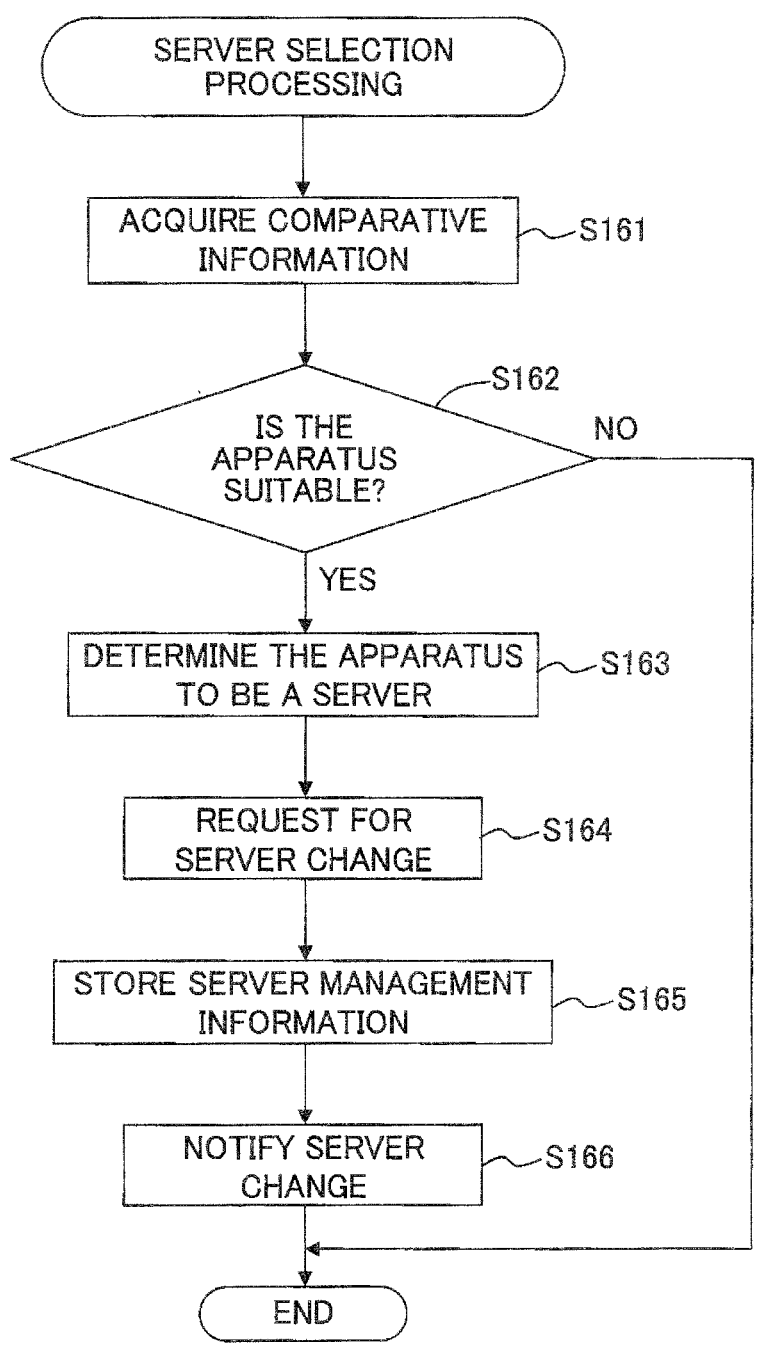
FIG. 8 is a flowchart showing a server selection processing in the first example.

FIG. 8 shows the server selection processing at step S106. Concretely, in the server selection processing, firstly, comparative information for judging as to which one of the current server and the MFP 100 is suitable as a server for the function extracted at step S102 is acquired from the current server (step S161). Then, based on the comparative information, a judgment of whether or not the MFP 100 is suitable as a server is made (step S162).

At step S162, for instance, the judgment of whether or not the MFP 100 is suitable as a server is made based on a frequency of usage of the current server and the MFP 100 regarding the function which has been extracted at step S102 for example. By making the apparatus with a high frequency of usage to be a server, a frequency of communication with the server using the network can be expected to be reduced. In this case, information of the number of pages accumulated is acquired as information of the frequency of usage from the current server. Moreover, the number of pages accumulated is compared and an apparatus for which the number of pages accumulated is large is judged to be suitable as a server. As information of the frequency of usage, it is possible to use a time taken for accumulating, a duration from the start-up time, and a time of the latest use, apart from the number of pages accumulated. At step S161, information necessary for a judgment at step S162 is acquired.

Moreover, while making the judgment at step S162, the judgment of whether or not the MFP 100 is suitable as a server may be made based on a processing performance of the current server and the MFP 100, apart from the frequency of usage. By making an apparatus having the superior processing performance to be the server, processing load as a server can be expected to be reduced. In this case, information of the CPU speed is acquired from the current server as information of the processing performance. Moreover, the CPU speed of the current server and the CPU speed of the MFP 100 are compared, and whichever of the current server and the CPU 100 has the faster CPU speed is judged to be suitable as a server. As information of the processing performance, apart from the CPU speed, it can also be calculated from the printing speed (time for printing one page) provided that it is a function such as the PC-PRINT function. At step S161, information which is necessary for the judgment at step S162 is achieved.

The comparative information is not restricted to be one information, and may be a plurality of information. For instance, in a case in which, the processing performance is same, a judgment may be made based on the frequency of usage. Moreover, in a case in which, the current server and the MFP 100 are same as a result of comparison, the current server may be judged to be suitable. Changing the server frequently is not preferable as it may lead to an increase in the communication load and loss of data. Therefore, when the current server and the MFP 100 are same, it is preferable not to change the server.

In a case in which, the MFP 100 is suitable as a server (YES at step S162), the MFP 100 is determined to be a server for that function, instead of the current server, (step S163). In other words, the MFP 100 updates the server name corresponding to that function, of the apparatus information DB 341 of the MFP 100, from the current server name to MFP 100.

Moreover, the MFP 100 transmits a request for server change to the current server (hereinafter called as an 'old server') which was subjected to comparison at step S162 (step S164). As the old server receives the request for server change, the old server halts functioning as server, and transmits information of the management information DB 342 (server management information) managed by the old server to the MFP 100 which is a source of request for server change. As the MFP 100 receives the server management information from the old server, the MFP 100 creates the management information DB 342, and stores the server management information which has been received in the management information DB 342 (step S165). Moreover, a fact that the MFP 100 has determined MFP 100 to be a server corresponding to that function is notified to the other apparatuses including the old server (step S166). When each of the other apparatuses receives the notification at step S166, each apparatus updates the apparatus information DB 341. After step S166, the server selection processing is terminated.

Whereas, in a case that the MFP 100 is unsuitable as a server (NO at step S162), it is not necessary to update the server. Therefore, the server selection processing is terminated without changing the server.

After selecting the server at step S106, or after the notification of server determination at step S123, or in a case that the MFP 100 is a server of a function other than the function extracted at step S102 (YES at step S104), a judgment as to whether or not the MFP 100 has a function other than the function which has been extracted at step S102 is made (step S107). In a case that the MFP 100 has a function other than the function extracted at step S102 (YES at step S107), the process shifts to step S102, and a function which is to be updated newly is extracted. Whereas, in a case that the MFP 100 does not have a function other than the function extracted at step S102 (NO at step S107), the server auto-determination processing is terminated.

Each of the MFPs 100, 101, 102, 103, and 104 in the first example execute the server auto-determination processing. Moreover, with respect to the function of that apparatus, each of the MFPs 100, 101, 102, 103, and 104 acquires information which indicates the current server of that function, and when that apparatus is more suitable as a server than the current server of that function, that apparatus is determined to be a server for that function. Assuming that that apparatus is a server, and that the other apparatus is suitable as a server than that apparatus, a request for server change is transmitted from the other apparatus to that apparatus, and that apparatus discontinues functioning as a server. Accordingly, it is possible to avoid an unsuitable apparatus which does not have a specific function, from being selected as a server of that specific function.

By all the MFPs 100, 101, 102, 103, and 104 in the image processing system 500 executing the auto-determination processing, the MFP which has been selected as a server for the specific function has that specific function. Therefore, in a case in which, information indicating that it is a current server at step S142 has been received, it means that the current server is capable of executing that specific function. In the first example, since the MFP acquires information indicating the current server for a function of that apparatus, when the server which has been determined is either that apparatus or the current server, it is an apparatus which has the specific function.

[SECOND EXAMPLE]

Figure 9A:
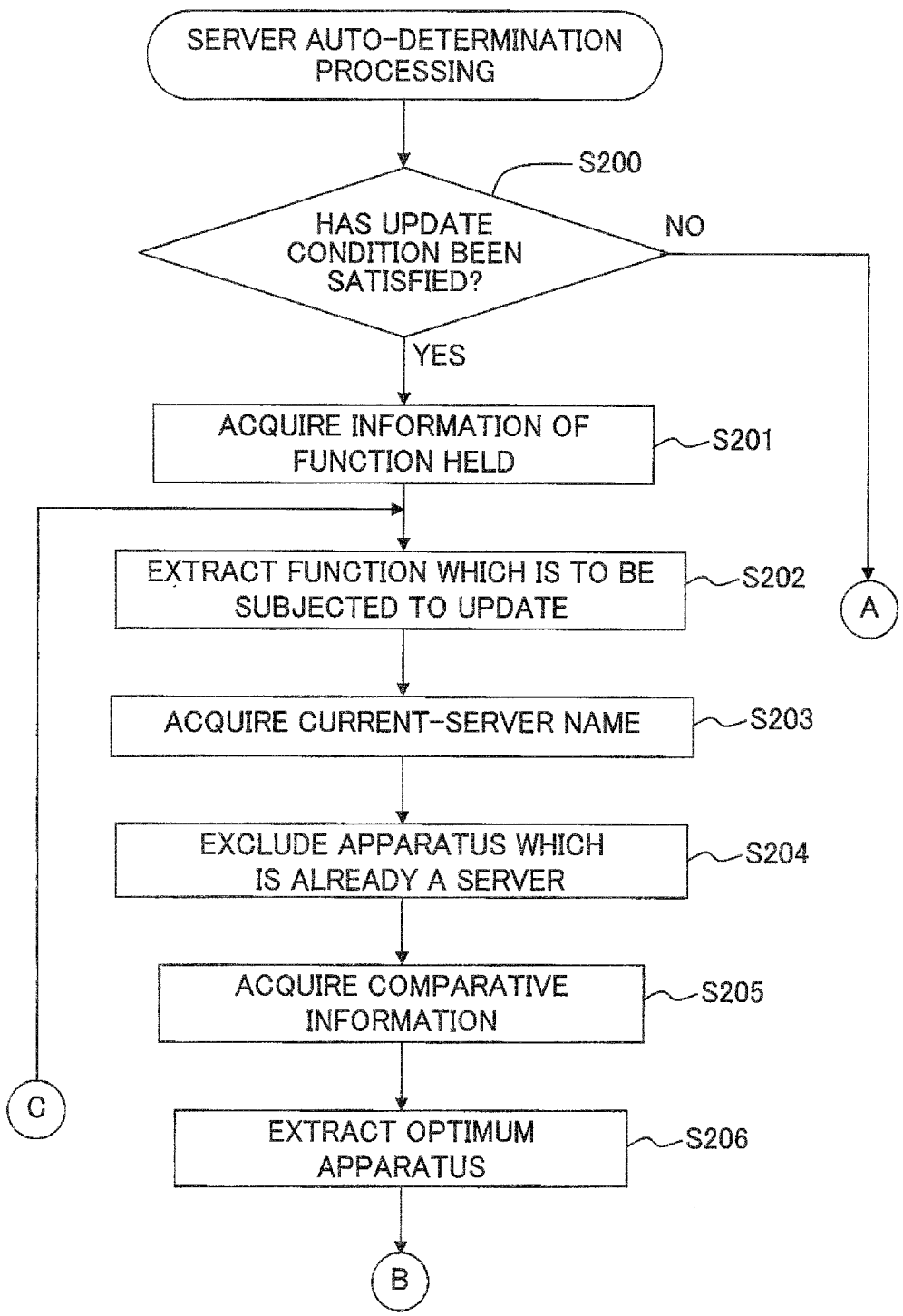
FIGS. 9A and 9B show a flowchart showing a server auto-selection processing in a second example of the present invention.
Figure 9B:
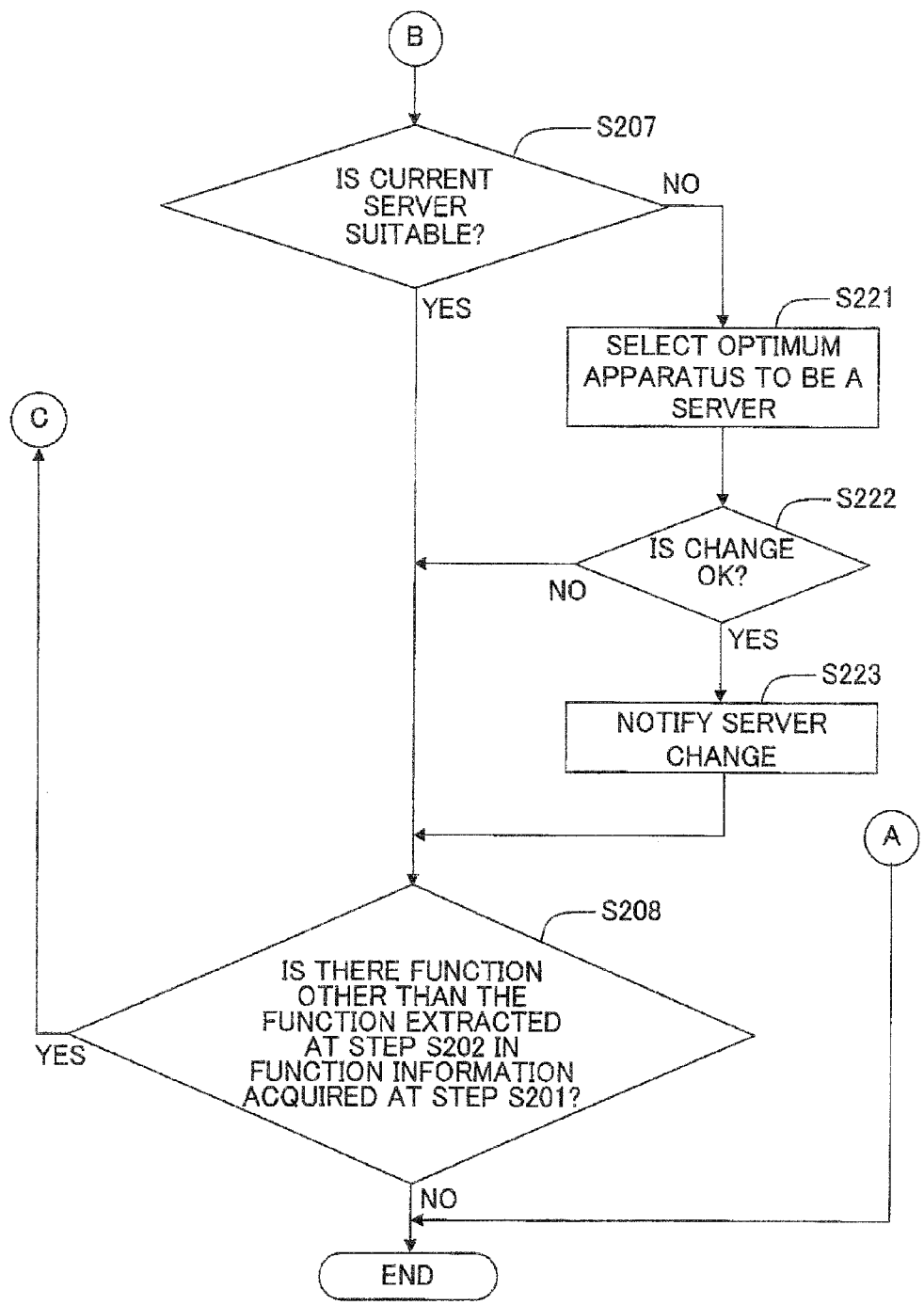

A server auto-selection processing executed by the PC 200 (an example of the server selecting apparatus) will be described below while referring to a flowchart in FIG. 9. In this case, a computer-executable server selection program is stored in the HDD 54 of the PC 200, and the server auto-selection processing is realized by executing the server selection program by the CPU 51 of the PC 200. The server selection program may be installed by utilizing a computer-readable medium such as CD-ROM or may be downloaded over a network. The server auto-selection processing is executed repeatedly by the CPU 51 at a predetermined interval (for example, 10 minutes) or upon receiving an instruction for start-up from the user.

In the server auto-selection processing, firstly, the PC 200 makes a judgment of whether or not update conditions for updating a server are satisfied (step S200). In a second example, a time elapsed after satisfying the previous update conditions corresponds to surpassing of an update interval which has been set in advance. Moreover, start-up of the PC 200 is also included in the update conditions. In a case in which, the update conditions are not satisfied (NO at step S200), the server auto-selection processing is terminated.

In a case in which, the update conditions are satisfied (YES at step S200), each of the MFPs 100, 101, 102, 103, and 104 in the image processing system 500 acquires information of functions of the respective MFPs 100, 101, 102, 103, and 104 (step S201). Information of the functions held may be stored in the PC 200 in advance, or may be inquired to each of the MFPs 100, 101, 102, 103, and 104.

Next, from among the image processing functions which can be executed by the image processing system 500, one function which is to be subjected to update (an example of the specific function) is extracted (step S202). For the function which has been extracted, a current-server name (an example of the specific function information) is acquired (step S203). It is possible to acquire the current-server name by transmitting a request for server name to each of the MFPs 100, 101, 102, 103, and 104, and receiving a response from the current server, similarly as at step S141 in the first example. The request for server name may be transmitted only to an MFP having the function which has been extracted, based on the information of function of each MFP which has been acquired at step S201.

Next, regarding selecting a server of the function which has been extracted at step S202, for avoiding one apparatus from becoming a server of a plurality of functions, an apparatus which already has become a server of the other function is excluded from the target of selection (step S204). For instance, in a case in which, the PC-SCAN function has been extracted at step S202, the MFPs 101, 102, and 103 are to be subjected to selection (i.e. MFPs 101, 102, and 103 are identified as the apparatuses which are capable of executing the processing of the PC-SCAN function), and when the MFP 103 has supposedly become a server of the PC-PRINT function, the MFP 103 is excluded from the target for selection at step S204.

Next, comparative information for judging as to which MFP is suitable as a server of the function acquired at step S202 is acquired from the MFP which is to be subjected to selection at step S203 and which has not been excluded from the target of selection at step S204 (step S205). Information to be acquired at step S205 is similar to the information acquired at step S161 in the first example. Based on the information acquired at step S205, the optimum MFP is extracted (step S206). For instance, when the comparative information is a processing speed, an MFP with the maximum CPU speed is extracted.

Next, a judgment of whether or not the MFP extracted is a current server, or in other words, whether or not the current server is optimum is made (step S207). In a case in which, the current server is not the optimum (NO at step S207), the MFP which has been extracted at step S206 is selected as a server of the function which has been extracted at step S202 (step S221).

After selecting the server, a permission for changing the server is inquired to the user (step S222). For instance, a message of whether or not the server change is permitted from the current server to the MFP which has been selected at step S221, is displayed on the display section 56 of the PC 200, and input by user from the operating section 55 is awaited. In a case that an inquiry destination has been registered in the PC 200, an inquiry may be made to the inquiry destination which has been registered. In a case in which, the change of server has been permitted (YES at step S222), a notification of the server change is transmitted to the MFP which has been extracted at step S206 (step S223).

The MFP which has received the notification of the server change at step S223 updates in that MFP, the server name for the function which has been extracted at step S202, recorded in the information DB 341 of that MFP. Furthermore, the MFP which has received the notification of the server change transmits a request for server change to the current server (hereinafter called as an 'old server') which was subjected to comparison at step S207. As the old server receives the request for server change from that MFP, the old server discontinues functioning as a server, and transmits server management information of the management information DB 342 managed by the old server, to that MFP which is a source of the request for server change. As the MFP which has transmitted the request for server change (in other words, the MFP which has received the notification of server change at step S223) receives server management information from the old server, the MFP creates the management information DB 342 in that MFP, and stores the server management information which has been received, in the management information DB 342. Moreover, the MFP which has received the notification of server change at step S223 notifies to other MFPs including the old server that that MFP has been determined to be a server, to other MFPs including the old server. As the other MFP receives the notification, the other MFP updates the apparatus information DB 341 of that apparatus. The procedure is similar to the procedure from step S164 to step S166 in the first example.

Whereas, in a case that the current server is the optimum (YES at step S207), or a case that the server change has not been permitted (NO at step S222), it is not necessary to change the server. Therefore, the process shifts to step S208 without changing the server.

In a case that it is not possible to acquire the current-server name at step S203, since the current server does not exist, a judgment is made at step S203 that the current server is not the optimum. Moreover, the MFP which has been extracted at step S206 is selected newly as a server of that function.

In a case that the server change has not been permitted or after the notification of the server change at step S223 (NO at step S222), or in a case that the current server is the optimum (YES at step S207), a judgment of whether or not there exists a function other than the function which has been extracted at step S202 in the function information which has been acquired at step S201 is made (step S208). In a case that there exists another function (YES at step S208), the process shifts to step S202, and a function to be subjected to update is extracted newly. Whereas, in a case that no other function exists (NO at step S208), the server auto-selection processing is terminated.

The PC 200 in the second example, with respect to a specific function which can be executed by the image processing system 500, selects the optimum apparatus from the MFPs having that specific function. Accordingly, it is possible to avoid an apparatus not having that specific function from being selected as a server of that specific function.

As it has been described above in detail, the MFP 100 in the first example or the PC 200 in the second example, at the time of selecting a server which manages the execution information related to the specific function from among the image processing functions targets MFPs which are capable of executing that specific function. In such manner, by selecting the server of the specific function from the MFPs which are capable of executing that specific function, the load of communication is not exerted when the specific function is executed in the server. Therefore, the MFP which has been selected can be set to be preferable as a specific server.

The embodiment described above is a mere exemplification, and does not restrict the present invention. Therefore, as a matter of course, various modifications and changes may be made without departing from the scope of the present invention. For instance, an image processing apparatus which is to be subjected to management may be an image processing apparatus which has an image processing function such as a printing function and a scanning function, and the present invention is also applicable to an apparatus other than a multi-function peripheral such as a printer, a scanner, a copy machine, and a FAX machine.

Moreover, in the embodiment described above, the maximum number of times for which the specific function can be executed has been stored as information managed by a server. However, information which is to be managed by a server is not restricted to the maximum number of times for which the specific function can be executed. For instance, execution record (history) and error information related to that specific function correspond to the information to be managed by a server.

Moreover, in the embodiment described above, the comparative information such as the frequency of usage and the processing performance is acquired from each MFP. However, in a case that there is a server which manages such information, the information may be acquired from the server. For reducing the load of communication, it is preferable that the apparatus has a server.

In the embodiment described above, after the MFP to which the server is to be changed is selected, processing up to the server change has been carried out automatically. However, the change may be carried out by the user. For instance, after selecting the target of change, even if the target of change is only to be notified to the user, the user is capable of identifying an appropriate target of change. Therefore, even when it is a server change to be carried out manually by the user, the change to an unsuitable MFP can be expected to be avoided.

Moreover, in the embodiment described above, the update conditions at step S100 or step S200 are let to be the start-up time and the predetermined update interval of each MFP. However, the update conditions are not restricted to the start-up time and the predetermined update interval. For instance, with respect to the MFP 100, if the MFP 100 is detected to have been connected to the network of the image processing system 500, it may be possible to regard the detection of the MFP 100 being connected to the network as an update condition. Moreover, with respect to the PC 200, if a new image processing apparatus is detected to have been added to the image processing system 500, it may be possible to regard the detection of the new image processing apparatus being added to the network as an update condition. In a case that the new image processing apparatus is added newly to the image processing system 500, selecting the server including that image processing apparatus once again increases the possibility of a more suitable image processing apparatus being selected as a server. The update conditions, apart from the abovementioned update conditions, may be arbitrary instructions by the user.

Moreover, in the embodiment described above, the server change of all image processing functions of the MFPs or the image processing system 500 is judged at the predetermined update interval. However, the server change may also be judged at a predetermined timing for each image processing function. For instance, the update interval may be set for each image processing function, and the server may be updated at timing different for each image processing function.

Moreover, in the first example, at the time of changing the server, no inquiry is made to the user. However, similarly as at step S221 in the second example, an arrangement may be made such that an inquiry is made to the user for the permission for server change, and when the permission for server change is taken the server is changed.

Moreover, the server auto-selection processing in the second example is executed by the PC 200 which is capable of inputting a job. However, the server auto-selection processing is not restricted to the PC 200. For instance, a dedicated apparatus which selects a server may be introduced in the image processing system 500, and the server auto-selection processing may be executed from the dedicated apparatus.

Furthermore, the server auto-selection processing in the second example may be executed by each of the MFPs 100, 101, 102, 103, and 104. However, in the server auto-selection processing in the second example, since a server for each of the image processing functions which can be executed by the image processing system 500 is selected, when the server auto-selection processing is executed by the plurality of apparatuses (MFPs), the communication load increases. Therefore, it is preferable to limit the number of apparatuses (MFPs) which are capable of executing the server auto-selection processing.

Moreover, in the server auto-selection processing in the second example, after the MFP to which the change is made has been selected, the result of selection is notified only to the MFP to which the change is made from the PC 200, and the processing related to the change is carried out among the MFPs. However, the notification related to the server change may also be transmitted from the PC 200. For instance, the notification of the server change to the other MFP may be transmitted from the PC 200.

Moreover, the processing disclosed in the embodiment may be executed by a single CPU, a plurality of CPUs, and hardware such as ASIC, or may be executed by a combination of the CPU and hardware such as ASIC. It is also possible to realize the processing disclosed in the embodiment, by a recording medium in which a computer program for executing the processing, or by various modes such as methods.

What is claimed is:

1. A server selecting apparatus which is configured to communicate with at least one image processing apparatus, the server selecting apparatus comprising:
    a communication unit configured to communicate with the at least one image processing apparatus; and
    a control device configured to:
        acquire, via the communication unit, specific function information as to whether the at least one image processing apparatus is capable of executing the processing of a specific function which is a specific image processing function;
        identify at least one specific-function executable apparatus which is capable of executing the processing of the specific function from among the at least one image processing apparatus, based on the specific function information;
        select one image processing apparatus as a specific server to manage execution of the specific function with respect to all of the at least one specific-function executable apparatus, from among the at least one specific-function executable apparatus; and
        exclude from the selection as a specific server an image processing apparatus, which is included in the at least one specific-function executable apparatus and that is selected to function as a server to manage execution information of another image processing function other than the specific function.

2. The server selecting apparatus according to claim 1, wherein the control device is configured to further acquire execution frequency information of the specific function as to how frequently the processing of the specific function is executed by the at least one specific-function executable apparatus, and to select the one image processing apparatus which has executed the processing of the specific function most frequently as the specific server, based on the execution frequency information.

3. The server selecting apparatus according to claim 1, wherein the control device is configured to further acquire processing performance information of the at least one specific-function executable apparatus, and to select the one image processing apparatus which has the most superior processing performance as the specific server, based on the processing performance information.

4. The server selecting apparatus according to claim 1, wherein the control device is configured to perform acquisition processing to acquire the specific function information and selection processing to select the specific server repeatedly, and
    the control device is configured to change the specific server from an image processing apparatus which has been selected in a previous selection processing to the image processing apparatus selected in a current selection processing.

5. The server selecting apparatus according to claim 4, wherein the control device is configured to further inquire a user whether or not the change of the specific server by the control device is allowed, and
    the control device is configured to change the specific server in a case that the change of the specific server is allowed by the user, and not to change the specific server in a case that the change of the specific server is not allowed by the user.

6. The server selecting apparatus according to claim 1, wherein the communication unit is configured to communicate with the at least one image processing apparatus via a network, and
    the control device is configured to detect that a new image processing apparatus has been added to the network, and to select the server from the at least one specific-function executable apparatus and the new image processing apparatus, in a case that the control device has detected that the new image processing apparatus has been added to the network.

7. A non-transitory computer-readable medium storing computer-executable program that, when executed, causes a server selecting apparatus to:
    acquire specific function information as to whether at least one image processing apparatus communicating with the server selecting apparatus is capable of executing the processing of a specific function which is a specific image processing function;
    identify at least one specific-function executable apparatus which is capable of executing the processing of the specific function from among the at least one image processing apparatus, based on the specific function information;
    select one image processing apparatus as a specific server, to manage execution of the specific function with respect to all of the at least one specific-function executable apparatus, from among the at least one specific-function executable apparatus; and
    exclude from the selection as a specific server an image processing apparatus, which is included in the at least one specific-function executable apparatus and that is selected to function as a server to manage execution information of another image processing function other than the specific function.

8. An information processing apparatus which is configured to communicate with at least one image processing apparatus, the information processing apparatus comprising:
    an image processing unit configured to execute image processing,
    a communication unit configured to communicate with the at least one image processing apparatus, and
    a control device configured to:
        search, via the communication unit, a specific server which manages execution information of a specific function which is an image processing function executable by the image processing unit, from among the at least one image processing apparatus;

exclude from the selection as a specific server an image processing apparatus, which is included in the at least one image processing apparatus and that is selected to function as a server to manage execution information of another image processing function other than the specific function; and determine the information processing apparatus to be the specific server, in a case that the specific server has not been found from among the at least one image processing apparatus.

9. The information processing apparatus according to claim 8, wherein the control device is further configured to:

acquire execution frequency information of the specific function as to how frequently the processing of the specific function is executed from the specific server in a case that the specific server has been found from among the at least one image processing apparatus; and judge whether the information processing apparatus has an execution frequency higher than an execution frequency of the specific server based on the execution frequency information, and in a case that the control device judged that the information processing apparatus has executed the processing of the specific function more frequently than the specific server, the control device is configured to determine the information processing apparatus to be a new specific server.

10. The information processing apparatus according to claim 8, wherein the control device is further configured to:

acquire a processing performance information from the specific server in a case that the specific server has been found from among the at least one image processing apparatus; and judge whether a processing performance of the information processing apparatus is better than a processing performance of the specific server based on the processing performance information, and in a case that the control device judged that the information processing apparatus has better processing performance than the specific server, the control device is configured to determine the information processing apparatus to be a new specific server.

* * * * *